(12) United States Patent
Sacripante

(10) Patent No.: US 8,466,254 B2
(45) Date of Patent: Jun. 18, 2013

(54) POLYESTER PROCESS

(75) Inventor: Guerino G Sacripante, Oakville (CA)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 13/552,612

(22) Filed: Jul. 18, 2012

(65) Prior Publication Data
US 2012/0283392 A1 Nov. 8, 2012

Related U.S. Application Data

(62) Division of application No. 12/548,909, filed on Aug. 27, 2009, now Pat. No. 8,257,899.

(51) Int. Cl.
*C08G 63/00* (2006.01)
*G03G 9/00* (2006.01)

(52) U.S. Cl.
USPC .......... 528/274; 528/303; 528/306; 528/371; 430/109.4

(58) Field of Classification Search
USPC ............... 528/192, 274, 275, 301, 303, 306, 528/371; 430/109.4
See application file for complete search history.

(56) References Cited

U.S. PATENT DOCUMENTS

| 3,590,000 | A | 6/1971 | Palermiti et al. |
| 3,655,374 | A | 4/1972 | Palermiti et al. |
| 3,720,617 | A | 3/1973 | Chatterji et al. |
| 3,847,604 | A | 11/1974 | Hagenbach et al. |
| 3,944,493 | A | 3/1976 | Jadwin et al. |
| 3,983,045 | A | 9/1976 | Jugle et al. |
| 4,007,293 | A | 2/1977 | Mincer et al. |
| 4,079,014 | A | 3/1978 | Burness et al. |
| 4,295,990 | A | 10/1981 | Verbeek et al. |
| 4,394,430 | A | 7/1983 | Jadwin et al. |
| 4,533,614 | A | 8/1985 | Fukumoto et al. |
| 4,560,635 | A | 12/1985 | Hoffend et al. |
| 4,727,011 | A | 2/1988 | Mahabadi et al. |
| 4,788,122 | A | 11/1988 | Kawabe et al. |
| 4,935,326 | A | 6/1990 | Creatura et al. |
| 4,937,166 | A | 6/1990 | Creatura et al. |
| 4,988,794 | A | 1/1991 | Kubo et al. |
| 5,227,460 | A | 7/1993 | Mahabadi et al. |
| 5,236,629 | A | 8/1993 | Mahabadi et al. |
| 5,290,654 | A | 3/1994 | Sacripante et al. |
| 5,302,486 | A | 4/1994 | Patel et al. |
| 5,330,874 | A | 7/1994 | Mahabadi et al. |
| 5,366,841 | A | 11/1994 | Patel et al. |
| 5,376,494 | A | 12/1994 | Mahabadi et al. |
| 5,407,772 | A | 4/1995 | Bayley et al. |
| 5,449,719 | A | 9/1995 | Sacripante et al. |
| 5,466,554 | A | 11/1995 | Sacripante et al. |
| 5,686,218 | A | 11/1997 | Liebermann et al. |
| 5,714,568 | A | 2/1998 | Nava |
| 6,004,714 | A | 12/1999 | Ciccarelli et al. |
| 6,063,827 | A | 5/2000 | Sacripante et al. |
| 6,127,080 | A * | 10/2000 | Sacripante et al. ........ 430/109.4 |
| 6,180,747 | B1 | 1/2001 | Sacripante et al. |
| 6,190,815 | B1 | 2/2001 | Ciccarelli et al. |
| 6,291,122 | B1 | 9/2001 | Sacripante et al. |
| 2008/0199797 | A1 | 8/2008 | Sacripante et al. |
| 2009/0047593 | A1 | 2/2009 | Vanbesien et al. |

* cited by examiner

*Primary Examiner* — Mark F Huff
*Assistant Examiner* — Stewart Fraser
(74) *Attorney, Agent, or Firm* — Eugene O. Palazzo

(57) ABSTRACT

The present disclosure provides processes for the preparation of unsaturated polyesters. In embodiments, a process of the present disclosure includes reacting an organic diol with a cyclic alkylene carbonate in the presence of a first catalyst to thereby form a polyalkoxy diol, optionally adding thereto a further amount of cyclic alkylene carbonate in the presence of a second catalyst, and subsequently polycondensing the resulting mixture with a dicarboxylic acid in combination with an anhydride.

6 Claims, No Drawings

POLYESTER PROCESS

This application is a divisional application of U.S. pending patent application Ser. No. 12/548,909, filed Aug. 27, 2009, the disclosure of which is totally incorporated herein by reference.

BACKGROUND

The present disclosure provides a process for the preparation of polyester polymers, which may be utilized in the preparation of toner compositions.

Polyester resins may be prepared by a polycondensation process involving the reaction of a diol monomer and a diacid or diester monomer, producing water or an alcohol as a byproduct, which is collected by distillation. Unsaturated polyester resins can be similarly prepared by this process, with the primary exception that the diacid monomer is unsaturated, that is, it includes an alkene segment such as fumaric or maleic acid or diesters thereof.

Unsaturated polyester resins derived from propoxylated Bisphenol-A with fumaric acid are within the purview of those skilled in the art. The propoxylated Bisphenol-A may include, for example, a mixture of monomers prepared by the anionic propoxylation of Bisphenol-A with propylene oxide, in the presence of an alkali hydroxide catalyst in a pressurized vessel, wherein the mixtures obtained are the alkali salts of 4-(2-hydroxyethyl)-Bisphenol-A, bis 4,4'-(2-hydroxyethyl)-Bisphenol-A, and 4-(2'-hydroxyethyl-2-oxyethyl)-4'-(2-hydroxyethyl)-Bisphenol-A.

There exists an alternative condensation method of alkoxylation that can be accomplished by the reaction of a diol with a cyclic alkylene carbonate, wherein Bisphenol-A can be condensed with a cyclic propylene carbonate in the presence of a catalyst and release carbon dioxide as the byproduct at elevated temperatures, thus producing a mixture of propoxylated Bisphenol-A. This latter condensation method has numerous economic advantageous in terms of monomer cost and simplicity.

Electrophotographic toners may include a resin, such as a polyester, a pigment, and optionally a charge control agent. Various toner formulations are within the purview of those skilled in the art, for example, those including a crosslinked unsaturated polyester resin, which may be capable of forming toners having low fixing temperatures and offset properties. Examples of such resins include those disclosed, for example, in U.S. Pat. No. 5,227,460, the disclosure of which is incorporated by reference in its entirety, wherein there is disclosed a poly(propoxylated bisphenol co-fumarate) which is crosslinked to a gel content of up to about 40 weight percent utilizing a peroxide to provide a toner useful for electrophotographic processes.

Other polyesters and processes for their preparation, as well as toners including these polyesters, include those disclosed in U.S. Pat. Nos. 6,291,122, 6,127,080, 6,180,747, 6,063,827, 5,449,719, 5,407,772, 4,788,122, 5,466,554, 5,686,218, 4,988,794, 4,727,011, 4,533,614, 5,366,841, and 5,714,568, the disclosures of each of which are hereby incorporated by reference in their entirety.

Improved methods for producing polyester resins and utilizing same in toner compositions remain desirable.

SUMMARY

The present disclosure provides producing polyesters, as well as toners. In embodiments, a process of the present disclosure may include reacting an organic diol with a cyclic alkylene carbonate in the presence of a first catalyst of an alkali carbonate to form a polyalkoxy diol; optionally contacting the polyalkoxy diol with an additional amount of cyclic alkylene carbonate in the presence of a second catalyst of an alkali alkoxide to form a mixture; polycondensing the resulting mixture with a dicarboxylic acid and an anhydride such as maleic anhydride, trimellitic anhydride, n-dodecenylsuccinic anhydride, 2-dodecenylsuccinic anhydride, 2-undecenylsuccinic anhydride, and combinations thereof, and recovering an unsaturated polyester.

In embodiments, a process of the present disclosure may include reacting an organic diol such as 1,2-propanediol, 1,3-propanediol, 1,3-butane diol, pentylene glycol, hexylene glycol, diphenol, neopentyl glycol, diethylene glycol, dipropylene glycol, 2,2-bis-(4-hydroxy phenyl)propane, 2,2-bis-(3-hydroxy phenyl)propane, 2,2-bis-(2-hydroxy phenyl)propane, 2,2-bis-(3-hydroxy phenyl)propane, 2,2-bis-(5-hydroxy phenyl)propane, Bisphenol-A, ethoxylated Bisphenol-A, bis-(4-hydroxy phenyl)methane, 1,1-bis-(4-hydroxy phenyl)ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, and combinations thereof, with a cyclic alkylene carbonate such as ethylene carbonate, propylene carbonate, butylene carbonate, and combinations thereof, in the presence of a first catalyst of an alkali carbonate to form a polyalkoxy diol; contacting the polyalkoxy diol with an additional amount of cyclic alkylene carbonate in the presence of a second catalyst of an alkali alkoxide to form a mixture; polycondensing the resulting mixture with a dicarboxylic acid and an anhydride such as maleic anhydride, trimellitic anhydride, n-dodecenylsuccinic anhydride, 2-dodecenylsuccinic anhydride, 2-undecenylsuccinic anhydride, and combinations thereof, the diacid and the anhydride utilized in a combined amount of from about 0.90 mole equivalents to about 1.1 mole equivalents; and recovering an unsaturated polyester.

In yet other embodiments, a process of the present disclosure may include reacting an organic diol such as 1,2-propanediol, 1,3-propanediol, 1,3-butane diol, pentylene glycol, hexylene glycol, diphenol, neopentyl glycol, diethylene glycol, dipropylene glycol, 2,2-bis-(4-hydroxy phenyl)propane, 2,2-bis-(3-hydroxy phenyl)propane, 2,2-bis-(2-hydroxy phenyl)propane, 2,2-bis-(3-hydroxy phenyl)propane, 2,2-bis-(5-hydroxy phenyl)propane, Bisphenol-A, ethoxylated Bisphenol-A, bis-(4-hydroxy phenyl)methane, 1,1-bis-(4-hydroxy phenyl)ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, and combinations thereof, with a cyclic alkylene carbonate such as ethylene carbonate, propylene carbonate, butylene carbonate, and combinations thereof, in the presence of a first catalyst of an alkali carbonate to form a polyalkoxy diol; optionally contacting the polyalkoxy diol with an additional amount of cyclic alkylene carbonate in the presence of a second catalyst of an alkali alkoxide to form a mixture; polycondensing the resulting mixture with a dicarboxylic acid and an anhydride such as maleic anhydride, trimellitic anhydride, n-dodecenylsuccinic anhydride, 2-dodecenylsuccinic anhydride, 2-undecenylsuccinic anhydride, and combinations thereof; recovering an unsaturated polyester; contacting the unsaturated polyester with an optional colorant, an optional surfactant, and an optional wax to form small particles; aggregating the small particles; coalescing the small particles to form toner particles; and recovering the toner particles.

DETAILED DESCRIPTION

In embodiments, a process of the present disclosure includes a monomer addition procedure of, for example, first alkoxylating a dihydroxy containing monomer, such as a dihydroxy alkane or dihydroxy arylene, with a cyclic alkylene carbonate in the presence of a catalyst such as an alkali carbonate, optionally followed by the addition of a further amount of cyclic alkylene carbonate in the presence of a second catalyst such as an alkali alkoxide, and followed by a subsequent addition of a diacid, such as a saturated or unsaturated aliphatic diacid or aromatic diacid, optionally with an anhydride, such as trimellitic anhydride, to enable the formation of a saturated or unsaturated polyester resin.

In embodiments, the general synthesis for forming the polyester resins is based upon the processes disclosed in U.S. Pat. Nos. 6,127,080 and 6,291,122, the disclosures of each of which are hereby incorporated by reference in their entirety.

In embodiments, a multistep "one pot" economical process for the preparation of polyester resins, such as an unsaturated polyester resin, is provided. Such a process includes the alkoxylation of a diol, such as Bisphenol-A, with an alkylene carbonate in the presence of an alkali carbonate such as potassium carbonate, followed optionally by a subsequent step of adding more alkylene carbonate in the presence of a second alkali alkoxide catalyst such as potassium methoxide, followed by the polycondensation step of adding thereto a diacid such as fumaric acid, optionally with an anhydride, such as trimellitic anhydride, to produce the polyester resin upon further heating and reducing the pressure.

In other embodiments, the present disclosure provides a process for the preparation of an unsaturated polyester which includes (i) reacting an organic diol with a cyclic alkylene carbonate in the presence of a first catalyst to thereby form a bis-alkoxy diol, and (ii) optionally adding thereto a further amount of cyclic alkylene carbonate in the presence of a second catalyst, and (iii) subsequently polycondensing the resulting mixture with an unsaturated diacid and/or an anhydride.

In embodiments, the present disclosure provides processes for the preparation of an unsaturated polyester which include (i) reacting an organic diol with a cyclic alkylene carbonate in the presence of a first catalyst to thereby form a polyalkoxy diol, and (ii) optionally, adding thereto a further amount of cyclic alkylene carbonate in the presence of a second catalyst, and (iii) subsequently polycondensing the resulting mixture with a dicarboxylic acid and/or an anhydride. In embodiments, the amount of organic diol may be from about 0.95 to about 1.05 mole equivalents, the amount of cyclic alkylene carbonate may be from about 1.95 to about 2.05 mole equivalents, and the amount of first alkali carbonate catalyst may be from about 0.001 to about 0.1 mole equivalents. The resulting polyalkoxy diol may include isomers with, for example, from about 2 to about 5 weight percent of isomer I, from about 95 to about 99 weight percent of isomer II, and from about 0 to about 3 weight percent of isomer III, where the sum of I, II, and III is about 100 percent and wherein said isomers are of the formulae as illustrated in Formula 2 below (2)

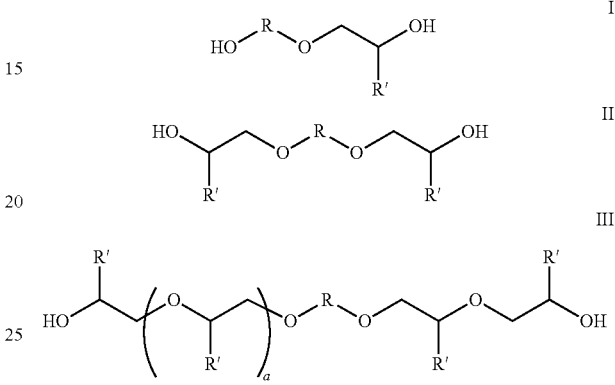

wherein R is an aromatic component, R' is hydrogen or alkyl, and a is zero, 1, or 2, or a mixture of zero, 1, and 2. The resulting polyalkoxy diol may then be polycondensed with a dicarboxylic acid in an amount of from about 0.95 to about 1.05 mole equivalents.

In other embodiments, a process of the present disclosure may include reacting an organic diol in an amount of from about 0.95 to about 1.05 mole equivalents, with a cyclic alkylene carbonate in an amount of from about 1.95 to about 2.05 mole equivalents, in the presence of a first alkali carbonate catalyst in an amount of from about 0.001 to about 0.1 mole equivalents; adding thereto from about 0.05 to about 0.45 mole equivalents of cyclic alkylene carbonate in the presence of a second alkali alkoxide catalyst in an amount of from about 0.001 to about 0.1 mole equivalents, to thereby form a polyalkoxy diol. The polyalkoxy diol thus formed may include isomers from about 0 to about 5 weight percent of isomer I, in embodiments from about 1 to about 2 weight percent of isomer I, from about 85 to about 97 weight percent of isomer II, in embodiments from about 90 to about 97 weight percent of isomer II, and from about 0 to about 15 weight percent of isomer III, in embodiments from about 1 to about 3 weight percent of isomer III, where the sum of I, II, and III is about 100 percent and wherein said isomers are of the formula as illustrated in Formula 1 below (1)

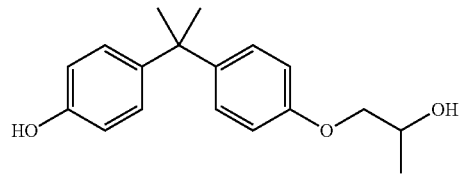

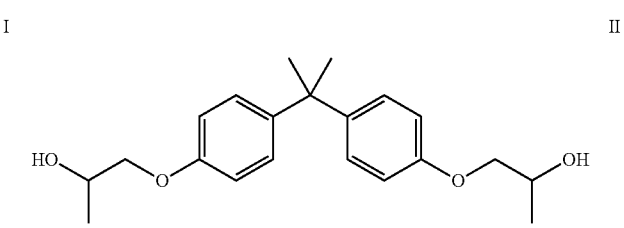

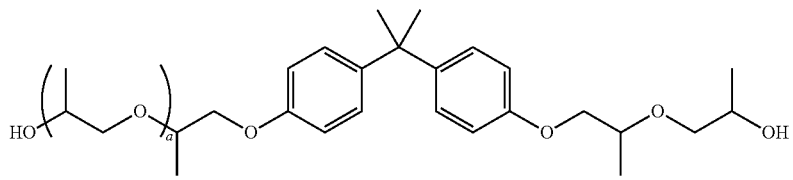

wherein a is zero, 1, or 2, or a mixture of zero, 1, and 2. The resulting polyalkoxy diol may then be polycondensed with a dicarboxylic acid in an amount of from about 0.95 to about 1.05 mole equivalents.

In embodiments, heat may be applied during the formation of the polyalkoxy diol, during the polycondensation process, or both. For example, heat may be applied during the formation of the polyalkoxy diol by heating at a temperature of from about 160° C. to about 215° C., in embodiments from about 175° C. to about 205° C., in embodiments from about 180° C. to about 200° C., for a period of time of from about 1 hour to about 6 hours. Heat may be applied during polycondensation by heating at a temperature of from about 185° C. to about 225° C., in embodiments from about 185° C. to about 225° C., for a period of from about 1 hour to about 5 hours, in embodiments from about 2 hours to about 4 hours, followed by reducing the pressure from about 760 Torr to about 1 Torr, over a period of from about 1 hour to about 6 hours, in embodiments from about 2 hours to about 5 hours.

After polycondensing, the reaction mixture may be cooled to from about 22° C. to about 40° C., in embodiments from about 25° C. to about 35° C., in some embodiments about 25° C.

Specific examples of diols selected for the process of the present disclosure include, for example, alkylene diols such as 1,2-propanediol, 1,3-propanediol, 1,3-butane diol, pentylene glycol, hexylene glycol, diphenol, neopentyl glycol, diethylene glycol, dipropylene glycol, 2,2-bis-(4-hydroxy phenyl)propane, 2,2-bis-(3-hydroxy phenyl)propane, 2,2-bis-(2-hydroxy phenyl)propane, 2,2-bis-(3-hydroxy phenyl) propane, 2,2-bis-(5-hydroxy phenyl)propane, Bisphenol-A, ethoxylated Bisphenol-A, bis-(4-hydroxy phenyl)methane, 1,1-bis-(4-hydroxy phenyl)ethane, cis-1,4-dihydroxy-cyclohexane, trans-1,4-dihydroxy-cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, and combinations thereof. In embodiments, a suitable diol includes 2,2-bis-(4-hydroxy phenyl)propane or Bisphenol-A The diols may be selected in an amount of from about 0.90 mole equivalents to about 1.1 mole equivalents, in embodiments from about 0.95 mole equivalents to about 1.05 mole equivalents, based on about 1 mole equivalent of dicarboxylic acid utilized.

Suitable cyclic alkylene carbonates include those having from about 3 to about 25 carbon atoms, including ethylene carbonate, propylene carbonate, 1,2-propylene carbonate, butylene carbonate, 1,2-butylene carbonate, combinations thereof, and the like. The amount of alkylene carbonate utilized can be from about 1.90 mole equivalents to about 2.45 mole equivalents, in embodiments from about 1.95 mole equivalents to about 2.40 mole equivalents, based on about 1 mole equivalent of organic diol utilized.

Suitable first alkali catalysts include alkali carbonates, wherein the alkali carbonate may be potassium carbonate, sodium carbonate, rubidium carbonate, cesium carbonate, beryllium carbonate, magnesium carbonate, calcium carbonate, strontium carbonate, manganese carbonate, barium carbonate, and combinations thereof. In embodiments potassium carbonate may be utilized as the first alkali catalyst. The alkali carbonates may be utilized in an amount of from about 0.001 mole equivalents to about 0.1 mole equivalents, in embodiments from about 0.005 mole equivalents to about 0.05 mole equivalents, based on about 1 mole equivalent of organic diol utilized.

Suitable second catalysts include alkali alkoxides, such as lithium methoxide, lithium ethoxide, lithium propoxide, lithium butoxide, lithium isopropoxide, lithium isobutoxide, lithium t-butoxide, potassium methoxide potassium ethoxide, potassium propoxide, potassium butoxide, potassium isopropoxide, potassium isobutoxide, potassium t-butoxide, sodium methoxide, sodium ethoxide, sodium propoxide, sodium butoxide, sodium isopropoxide, sodium isobutoxide, sodium t-butoxide, and combinations thereof. In embodiments, the alkyl alkoxide may be potassium t-butoxide. The alkali alkoxide may be utilized in amounts of from about 0.001 mole equivalents to about 0.1 mole equivalents, in embodiments from about 0.005 mole equivalents to about 0.05 mole equivalents, based on about 1 mole equivalent of organic diol utilized.

In embodiments, the first catalyst may be utilized in an amount of from about 0.01 to about 0.1 mole percent by weight of the unsaturated polyester, and the second catalyst may be utilized in an amount of from about 0.01 to about 0.1 mole percent by weight of the unsaturated polyester.

Dicarboxylic acids and/or anhydrides which may be utilized for the process of the present disclosure include fumaric acid, malonic acid, itaconic acid, 2-methylitaconic acid, maleic acid, maleic anhydride, n-dodecenylsuccinic anhydride, 2-dodecenylsuccinic anhydride, 2-undecenylsuccinic anhydride, trimellitic acid, trimellitic anhydride, adipic acid, succinic acid, suberic acid, 2-ethyl succinic acid, glutaric acid, dodecylsuccinic acid, 2-methyladipic acid, pimelic acid, azelaic acid, sebacic acid, terephthalic acid, isophthalic acid, phthalic acid, 1,2-cyclohexanedioic acid, 1,3-cyclohexanedioic acid, 1,4-cyclohexanedioic acid, dialkyl esters wherein the alkyl groups are from about 1 carbon atom to about 23 carbon atoms, in embodiments from about 2 carbon atoms to about 18 carbon atoms, and are esters of malonate, succinate, fumarate, itaconate, terephthalate, isophthalate, phthalate, cyclohexanedioate, and combinations thereof. In embodiments, a suitable dicarboxylic acid includes fumaric acid, in combination with an anhydride such as trimellitic anhydride. The diacids and/or anhydrides may be selected in a combined amount of from about 0.90 mole equivalents to about 1.1 mole equivalents, in embodiments from about 0.95 mole equivalents to about 1.05 mole equivalents, based on about 1 mole equivalent of organic diol utilized. The amount of diacids and/or anhydrides employed may be, for example, in an amount of from about 10 to about 60 percent by weight, in embodiments from about 25 to about 50 percent by weight, of the total weight of the reactants.

Utilizing the processes of the present disclosure, an unsaturated polyester resin may be formed. Exemplary unsaturated polyester resins include poly(propoxylated bisphenol co-fumarate), poly(ethoxylated bisphenol co-fumarate), poly(butyloxylated bisphenol co-fumarate), poly(co-propoxylated bisphenol co ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate), poly(propoxylated bisphenol co-itaconate), poly(ethoxylated bisphenol co-itaconate), poly(butyloxylated bisphenol co-itaconate), poly(co-propoxylated bisphenol co ethoxylated bisphenol co-itaconate), poly(1,2-propylene itaconate), combinations thereof, and the like.

In some embodiments, a crosslinked polyester may be formed, wherein crosslinking is represented by a gel content of from about 3 to about 75 percent, in embodiments from about 3 to about 45 percent. The crosslinked polyester may be generated, in embodiments, by the reactive extrusion of a crosslinker, in some cases a peroxide, and an unsaturated polyester produced in accordance with the present disclosure.

Various known crosslinking agents can be selected for the crosslinking of the prepared unsaturated polyester resins. Suitable crosslinking agents may include peroxides such as organic peroxides or azo-compounds for the generation of crosslinked toner resins of the disclosure. Suitable peroxides include peroxides such as, for example, benzoyl peroxide, lauryl peroxide, t-butyl peroxide, propyl peroxide, and stearyl peroxide. Other suitable peroxides include ketone peroxides such as, for example, cyclohexanone peroxide and methyl ethyl ketone, alkyl peroxy esters such as, for example, t-butyl peroxy neodecanoate, 2,5-dimethyl 2,5-di(2-ethyl hexanoyl peroxy)hexane, t-amyl peroxy 2-ethyl hexanoate, t-butyl peroxy 2-ethyl hexanoate, t-butyl peroxy acetate, t-amyl peroxy acetate, t-butyl peroxy benzoate, t-amyl peroxy benzoate, oo-t-butyl o-isopropyl mono peroxy carbonate, 2,5-dimethyl 2,5-di(benzoyl peroxy)hexane, oo-t-butyl o-(2-ethyl hexyl) mono peroxy carbonate, and oo-t-amyl o-(2-ethyl hexyl) mono peroxy carbonate, alkyl peroxides such as, for example, dicumyl peroxide, 2,5-dimethyl 2,5-di(t-butyl peroxy)hexane, t-butyl cumyl peroxide, alpha, alpha'-bis(t-butyl peroxy) diisopropyl benzene, di-t-butyl peroxide and 2,5-dimethyl 2,5-di(t-butyl peroxy)hexyne-3, alkyl hydroperoxides such as, for example, 2,5-dihydro peroxy 2,5-dimethyl hexane, cumene hydroperoxide, t-butyl hydroperoxide and t-amyl hydroperoxide, and alkyl peroxyketals such as, for example, n-butyl 4,4-di(t-butyl peroxy)valerate, 1,1-di(t-butyl peroxy) 3,3,5-trimethyl cyclohexane, 1,1-di(t-butyl peroxy)cyclohexane, 1,1-di(t-amyl peroxy)cyclohexane, 2,2-di(t-butyl peroxy)butane, ethyl 3,3-di(t-butyl peroxy)butyrate and ethyl 3,3-di(t-amyl peroxy)butyrate. Suitable azo-compounds include azobis-isobutyronitrile, 2,2'-azobis(isobutyronitrile), 2,2'-azobis(2,4-dimethyl valeronitrile), 2,2'-azobis(methyl butyronitrile), 1,1'-azobis(cyano cyclohexane) and other similar known compounds. The amount of crosslinking agent utilized may be from about 0.5 to about 5 percent by weight of the toner, in embodiments in an amount of from about 1 to about 4.5 weight percent of the toner.

In other embodiments, a process of the present disclosure for forming a polyester resin may include (i) reacting an organic diol in an amount of from about 0.95 to about 1.05 mole equivalent, with a cyclic alkylene carbonate in an amount of from about 1.95 to about 2.05 mole equivalents, and a catalyst in an amount of from about 0.001 to about 0.1 mole equivalent, at a temperature of from about 175° C. to about 205° C., for a duration of from about 1 to about 6 hours; (ii) optionally adding thereto a cyclic alkylene carbonate in an amount of from about 0.05 to about 0.35 mole equivalent, based on about 1 mole equivalent of organic diol utilized, with a second alkali alkoxide catalyst in an amount of from about 0.001 to about 0.1 mole equivalent, at a temperature of from about 185° C. to about 205° C. for a duration of from about 1 to about 3 hours; and (iii) followed by polycondensing with a dicarboxylic acid in an amount of from about 0.95 to about 1.05 mole equivalent, for a duration of from about 1 to about 3 hours, and followed by reducing the pressure from about 760 Torr to about 1 Torr over a period of from about 1 to about 6 hours.

In other embodiments, a process of the present disclosure may include a multi-step process for the preparation of polyester polymers, especially an unsaturated polyester resin, wherein the multi step process can be a two step or three step monomer addition process, and in some embodiments a two step monomer addition process, including a first step of alkoxylating a diol such as Bisphenol-A or 2,2-di(4-hydroxyphenyl)-propane, with a cyclic alkylene carbonate such as ethylene carbonate, propylene carbonate, and the like in the presence of a suitable catalyst such as an alkali carbonate, such as potassium carbonate, followed by a second step comprising of the addition of a suitable diacid or dicarboxylic acid, such as fumaric acid, optionally with an anhydride, such as trimellitic anhydride. Similarly, in embodiments, a three step monomer addition process may include (i) alkoxylating a diol such as Bisphenol-A or 2,2-di(4-hydroxyphenyl)-propane, with a cyclic alkylene carbonate such as ethylene carbonate, propylene carbonate, and the like in the presence of a suitable catalyst such as an alkali carbonate, such as potassium carbonate; (ii) adding thereto a further amount of cyclic alkylene carbonate in the presence of a second catalyst such as an alkali alkoxide, for example, sodium methoxide or potassium t-butoxide; and followed by (iii) the addition of a suitable diacid such as a dicarboxylic acid, in embodiments fumaric acid, optionally in combination with an anhydride, such as trimellitic anhydride.

The polyester resin obtained may be an unsaturated polyester which can be subjected to crosslinking, especially reactive extrusion processes, to a high gel content, such as from about 0.1 to about 60 percent, and in embodiments from about 3 to about 45 percent gel, in the presence of an initiator such as a peroxide, like benzoyl or lauryl peroxide and which peroxide is selected in an amount of for example, from about 0.01 to about 5 weight percent of the resin.

The unsaturated polyester resin, poly(propoxylated Bisphenol-A co-fumarate), described in the two step monomer process and utilizing only the alkali carbonate catalyst, generally exhibits high glass transition temperatures of from about 58° C. to about 62° C. at a molecular weight of from about 15,000 to about 20,000 grams per mole as measured by gel permeation chromatography. In many instances, it is desired that toner resins exhibit high glass transition temperatures of from about 58° C. to about 62° C., such that toner blocking is avoided or minimized, as well as the minimization of copy to copy offset. In order to obtain a high glass transition temperatures of from about 58° C. to about 62° C. at a molecular weight of from about 15,000 to about 20,000 grams per mole, it is necessary that the unsaturated polyester resin is derived from the propoxylated Bisphenol-A mixture, wherein the predominant isomer (Formula 1) includes from about 95 to about 99 weight percent of isomer II, and the isomer III is minimized of from about 0 to about 3 weight percent, because this latter isomer reduces the glass transition temperature of the resin. Conversely, in many instances, an unsaturated polyester resin, for example, poly(propoxylated Bisphenol-A-co-fumarate), with lower glass transition temperature such as from about 52° C. to about 57.9° C. is desired at a molecular weight of from about 15,000 to about 20,000 grams per mole as measured by gel permeation chromatography. Such unsaturated polyester resins with lower glass transition temperatures are useful in providing toners with low minimum fusing temperatures, thereby reducing the temperature of the fusing subsystem and reducing the energy consumption of the xerographic device. In order to obtain a lower glass transition temperatures of from about 52° C. to about 57.9° C. at a molecular weight of from about 15,000 to about 20,000 grams per mole, it is necessary that the unsaturated polyester resin is derived from the propoxylated Bisphenol-A mixture wherein the predominant isomer (Formula 1) includes from about 84 to about 97 weight percent of isomer II, and the isomer III includes from about 3 to about 15 weight percent of the isomeric mixture. If isomer III is utilized in an amount of more than about 15 weight percent, than the corresponding unsaturated resin will be proportionally lower in glass transition temperature. The aforementioned unsaturated poly(propoxylated Bisphenol-A-co-fumarate) of lower glass transition temperatures of from about 52° C. to about 57.9° C., can be obtained by the aforementioned three step process wherein the alkali carbonate is utilized in the first step, followed by the utilization of excess alkylene carbonate and alkali alkoxide catalyst in the second step, followed by the poly-esterification as described in the third step; and two step process comprising (i) charging a condensation type vessel equipped with a distillation apparatus, and vacuum line, with from about 0.95 to about 1.05 mole percent of a diol such as 2,2-bis(4-hydroxyphenyl)-propane, from about 1.95 to about 2.05 mole percent of a cyclic alkylene carbonate, with for example from about 1 to about 25, in embodiments from about 2 to about 12 carbon atoms, a cyclic carbonate such as ethylene carbonate, 1,2-propylene carbonate, 1,2-butylene carbonate, and the like and from about 0.001 to about 0.05 mole weight percent of a catalyst such as an alkali metal carbonate, such as potassium or sodium carbonate, followed by heating the mixture to, for example, a suitable temperature, of from 160° C. to about 205° C. for a duration of, for example, about 3 to about 9 hours and resulting in a mixture of propoxylated bisphenol-A intermediate; (ii) adding from about 0.95 to about 1.05 mole percent of a diacid such as fumaric acid, and heating the mixture with stirring to about 195° C. to about 220° C. for a duration of from about 3 to about 6 hours, and reducing the pressure of from about atmospheric pressure (760 Torr) to about 2 Torr over a period, for example, from about 1 to about 3 hours, and followed by pressurizing the vessel to atmospheric pressure and discharging the resin through a bottom valve; a three step process comprising (i) charging a condensation type vessel equipped with a distillation apparatus, and vacuum line, with from about 0.95 to about 1.05 mole percent of a diol such as 2,2-bis(4-hydroxyphenyl)-propane, from about 1.95 to about 2.05 mole percent of a cyclic alkylene carbonate, with for example from about 1 to about 25, and in embodiments from about 2 to about 12 carbon atoms, cyclic carbonate such as ethylene carbonate, 1,2-propylene carbonate, 1,2-butylene carbonate, and the like and from about 0.001 to about 0.05 mole weight percent of a catalyst such as an alkali metal carbonate, such as potassium or sodium carbonate, followed by heating the mixture to, for example, a suitable temperature, of from 160° C. to about 205° C. for a duration of, for example, about 2 to about 10 hours and resulting in a mixture of propoxylated bisphenol-A intermediate; (ii) adding thereto of from about 0.05 o about 0.25 moles of alkylene carbonate such as ethylene propylene carbonate and a second alkali alkoxide catalyst such as sodium methoxide potassium t-butoxide, and the like in an amount of from about 0.001 to about 0.05 mole weight percent, and continue heating at a temperature of from about 185° C. to about 205° C. for a duration of from about 0.5 hours to about 3 hours; followed by (iii) adding from about 0.95 to about 1.05 mole percent of a diacid such as fumaric acid, and heating the mixture with stirring to about 195° C. to about 220° C. for a duration of from about 3 to about 6 hours, and reducing the pressure of from about atmospheric pressure (760 Torr) to about 2 Torr over a period for example from about 1 to about 3 hours, and followed by pressurizing the vessel to atmospheric pressure and discharging the resin through a bottom valve.

In embodiments, the resin may be a branched amorphous resin. Examples of such resins include those disclosed in U.S. Pat. Nos. 6,180,747 and 6,291,122, the disclosures of each of which are hereby incorporated by reference in their entirety.

Toners containing crosslinked polyester resins described herein may exhibit, for example, desirable low temperature fixing characteristics such as from about 120° C. to about 145° C., and high offset properties such as from about 180° C. to about 225° C.

Toner

The resins described above, in embodiments a combination of polyester resins, may be utilized to form toner compositions. Such toner compositions may include optional colorants, waxes, and other additives. Toners may be formed utilizing any method within the purview of those skilled in the art including, but not limited to, emulsion aggregation methods.

Surfactants

In embodiments, colorants, waxes, and other additives utilized to form toner compositions may be in dispersions including surfactants. Moreover, toner particles may be formed by emulsion aggregation methods where the resin and other components of the toner are placed in one or more surfactants, an emulsion is formed, toner particles are aggregated, coalesced, optionally washed and dried, and recovered.

One, two, or more surfactants may be utilized. The surfactants may be selected from ionic surfactants and nonionic surfactants. Anionic surfactants and cationic surfactants are encompassed by the term "ionic surfactants." In embodiments, the surfactant may be utilized so that it is present in an amount of from about 0.01% to about 5% by weight of the toner composition, for example from about 0.75% to about 4% by weight of the toner composition, in embodiments from about 1% to about 3% by weight of the toner composition.

Examples of nonionic surfactants that can be utilized include, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonylphenyl ether, dialkylphenoxy poly(ethyleneoxy) ethanol, available from Rhone-Poulenc as IGEPAL CA-210™, IGEPAL CA-520™, IGEPAL CA-720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Colorants

As the colorant to be added, various known suitable colorants, such as dyes, pigments, mixtures of dyes, mixtures of pigments, mixtures of dyes and pigments, and the like, may be included in the toner. The colorant may be included in the toner in an amount of, for example, about 0.1 to about 35 percent by weight of the toner, or from about 1 to about 15 weight percent of the toner, or from about 3 to about 10 percent by weight of the toner.

As examples of suitable colorants, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP-604™, NP-608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido)phthalocyanine, x-copper phthalocyanine pigment listed in the Color Index as CI 74160, CI Pigment Blue, Pigment Blue 15:3, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Wax

In addition to the polymer binder resin and colorant, the toners of the present disclosure also optionally contain a wax, which can be either a single type of wax or a mixture of two or more different waxes. A single wax can be added to toner formulations, for example, to improve particular toner properties, such as toner particle shape, presence and amount of wax on the toner particle surface, charging and/or fusing characteristics, gloss, stripping, offset properties, and the like. Alternatively, a combination of waxes can be added to provide multiple properties to the toner composition.

Where utilized, the wax may be combined with the resin in forming toner particles. When included, the wax may be present in an amount of, for example, from about 1 weight percent to about 25 weight percent of the toner particles, in embodiments from about 5 weight percent to about 20 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes such as commercially available from Allied Chemical and Petrolite Corporation, for example POLYWAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550-P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures and combinations of the foregoing waxes may also be used in embodiments. Waxes may be included as, for example, fuser roll release agents.

Toner Preparation

The toner particles may be prepared by any method within the purview of one skilled in the art. Although embodiments relating to toner particle production are described below with respect to emulsion aggregation processes, any suitable method of preparing toner particles may be used, including chemical processes, such as suspension and encapsulation processes disclosed in U.S. Pat. Nos. 5,290,654 and 5,302,486, the disclosures of each of which are hereby incorporated by reference in their entirety. Other suitable processes include a reactive melt mixing process wherein the polyester resins are partially crosslinked. For example, low melt toner resins and toners may be fabricated by a reactive melt mixing process as illustrated for example, in U.S. Pat. No. 5,376,494, the disclosure of which is incorporated by reference in its entirety.

In embodiments, toner compositions and toner particles may be prepared by aggregation and coalescence processes in which small-size resin particles are aggregated to the appropriate toner particle size and then coalesced to achieve the final toner-particle shape and morphology.

In embodiments, toner compositions may be prepared by emulsion aggregation processes, such as a process that includes aggregating a mixture of an optional wax and any other desired or required additives, and emulsions including the resins described above, optionally in surfactants as described above, and then coalescing the aggregate mixture. A mixture may be prepared by adding an optional wax or other materials, which may also be optionally in a dispersion (s) including a surfactant, to the emulsion, which may be a mixture of two or more emulsions containing the resin(s). The pH of the resulting mixture may be adjusted by an acid such as, for example, acetic acid, nitric acid or the like. In embodiments, the pH of the mixture may be adjusted to from about 2 to about 4.5. Additionally, in embodiments, the mixture may be homogenized. If the mixture is homogenized, homogenization may be accomplished by mixing at about 600 to about 4,000 revolutions per minute. Homogenization may be accomplished by any suitable means, including, for example, an IKA ULTRA TURRAX T50 probe homogenizer.

Following the preparation of the above mixture, an aggregating agent may be added to the mixture. Any suitable aggregating agent may be utilized to form a toner. Suitable aggregating agents include, for example, aqueous solutions of a divalent cation or a multivalent cation material. The aggregating agent may be, for example, polyaluminum halides such as polyaluminum chloride (PAC), or the corresponding bromide, fluoride, or iodide, polyaluminum silicates such as polyaluminum sulfosilicate (PASS), and water soluble metal salts including aluminum chloride, aluminum nitrite, aluminum sulfate, potassium aluminum sulfate, calcium acetate, calcium chloride, calcium nitrite, calcium oxylate, calcium sulfate, magnesium acetate, magnesium nitrate, magnesium sulfate, zinc acetate, zinc nitrate, zinc sulfate, zinc chloride, zinc bromide, magnesium bromide, copper chloride, copper sulfate, and combinations thereof. In embodiments, the aggregating agent may be added to the mixture at a temperature that is below the glass transition temperature (Tg) of the resin.

The aggregating agent may be added to the mixture utilized to form a toner in an amount of, for example, from about 0.1 parts per hundred (pph) to about 1 pph, in embodiments from about 0.25 pph to about 0.75 pph, in some embodiments about 0.5 pph. This provides a sufficient amount of agent for aggregation.

The gloss of a toner may be influenced by the amount of retained metal ion, such as $Al^{3+}$, in the particle. The amount of retained metal ion may be further adjusted by the addition of EDTA. In embodiments, the amount of retained crosslinker, for example $Al^{3+}$, in toner particles of the present disclosure may be from about 0.1 pph to about 1 pph, in embodiments from about 0.25 pph to about 0.8 pph, in embodiments about 0.5 pph.

In order to control aggregation and coalescence of the particles, in embodiments the aggregating agent may be metered into the mixture over time. For example, the agent may be metered into the mixture over a period of from about 5 to about 240 minutes, in embodiments from about 30 to about 200 minutes. The addition of the agent may also be done while the mixture is maintained under stirred conditions, in embodiments from about 50 rpm to about 1,000 rpm, in other embodiments from about 100 rpm to about 500 rpm, and at a temperature that is below the glass transition temperature of the resin as discussed above, in embodiments from about 30° C. to about 90° C., in embodiments from about 35° C. to about 70° C.

The particles may be permitted to aggregate until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation thus may proceed by maintaining the elevated temperature, or slowly raising the temperature to, for example, from about 40° C. to about 100° C., and holding the mixture at this temperature for a time from about 0.5 hours to about 6 hours, in embodiments from about hour 1 to about 5 hours, while maintaining stirring, to provide the aggregated particles. Once the predetermined desired particle size is reached, then the growth process is halted. In embodiments, the predetermined desired particle size is within the toner particle size ranges mentioned above.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

In embodiments, the aggregate particles may be of a size of less than about 3 microns, in embodiments from about 2 microns to about 3 microns, in embodiments from about 2.5 microns to about 2.9 microns.

Shell Resin

In embodiments, an optional shell may be applied to the formed aggregated toner particles. Any resin described above as suitable for the core resin may be utilized as the shell resin. The shell resin may be applied to the aggregated particles by any method within the purview of those skilled in the art. In embodiments, the shell resin may be in an emulsion including any surfactant described above. The aggregated particles described above may be combined with said emulsion so that the resin forms a shell over the formed aggregates. In embodiments, an amorphous polyester may be utilized to form a shell over the aggregates to form toner particles having a core-shell configuration. In some embodiments, a low molecular weight amorphous resin may be utilized to form a shell over the formed aggregates.

The shell resin may be present in an amount of from about 10 percent to about 32 percent by weight of the toner particles, in embodiments from about 24 percent to about 30 percent by weight of the toner particles.

Once the desired final size of the toner particles is achieved, the pH of the mixture may be adjusted with a base to a value of from about 6 to about 10, and in embodiments from about 6.2 to about 7. The adjustment of the pH may be utilized to freeze, that is to stop, toner growth. The base utilized to stop toner growth may include any suitable base such as, for example, alkali metal hydroxides such as, for example, sodium hydroxide, potassium hydroxide, ammonium hydroxide, combinations thereof, and the like. In embodiments, ethylene diamine tetraacetic acid (EDTA) may be added to help adjust the pH to the desired values noted above. The base may be added in amounts from about 2 to about 25 percent by weight of the mixture, in embodiments from about 4 to about 10 percent by weight of the mixture.

Coalescence

Following aggregation to the desired particle size, with the formation of an optional shell as described above, the particles may then be coalesced to the desired final shape, the coalescence being achieved by, for example, heating the mixture to a temperature of from about 55° C. to about 100° C., in embodiments from about 65° C. to about 75° C., in embodiments about 70° C., which may be below the melting point of the crystalline resin to prevent plasticization. Higher or lower temperatures may be used, it being understood that the temperature is a function of the resins used for the binder.

Coalescence may proceed and be accomplished over a period of from about 0.1 to about 9 hours, in embodiments from about 0.5 to about 4 hours.

After coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include any known charge additives in amounts of from about 0.1 to about 10 weight percent, and in embodiments of from about 0.5 to about 7 weight percent of the toner. Examples of such charge additives include alkyl pyridinium halides, bisulfates, the charge control additives of U.S. Pat. Nos. 3,944,493, 4,007,293, 4,079,014, 4,394,430 and 4,560,635, the disclosures of each of which are hereby incorporated by reference in their entirety, negative charge enhancing additives like aluminum complexes, and the like.

Surface additives can be added to the toner compositions of the present disclosure after washing or drying. Examples of such surface additives include, for example, metal salts, metal salts of fatty acids, colloidal silicas, metal oxides, strontium titanates, mixtures thereof, and the like. Surface additives may be present in an amount of from about 0.1 to about 10 weight percent, and in embodiments of from about 0.5 to about 7 weight percent of the toner. Examples of such additives include those disclosed in U.S. Pat. Nos. 3,590,000, 3,720,617, 3,655,374 and 3,983,045, the disclosures of each of which are hereby incorporated by reference in their entirety. Other additives include zinc stearate and AEROSIL R972® available from Degussa. The coated silicas of U.S. Pat. Nos. 6,190,815 and 6,004,714, the disclosures of each of which are hereby incorporated by reference in their entirety, can also be present in an amount of from about 0.05 to about 5 percent, and in embodiments of from about 0.1 to about 2 percent of the toner, which additives can be added during the aggregation or blended into the formed toner product.

The characteristics of the toner particles may be determined by any suitable technique and apparatus. Volume average particle diameter $D_{50v}$, GSDv, and GSDn may be measured by means of a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3. Toners produced in accordance with the present disclosure may possess excellent charging characteristics when exposed to extreme relative humidity (RH) conditions. The low-humidity zone (C zone) may be about 10° C./15% RH, while the high humidity zone (A zone) may be about 28° C./85% RH. Toners of the present disclosure may also possess a parent toner charge per mass ratio (Q/M) of from about $-3$ μC/g to about $-35$ μC/g, and a final toner charging after surface additive blending of from $-10$ μC/g to about $-45$ μC/g.

Utilizing the methods of the present disclosure, desirable gloss levels may be obtained. Thus, for example, the gloss level of a toner of the present disclosure may have a gloss as measured by Gardner Gloss Units (ggu) of from about 20 ggu to about 100 ggu, in embodiments from about 50 ggu to about 95 ggu, in embodiments from about 60 ggu to about 90 ggu.

In embodiments, toners of the present disclosure may be utilized as ultra low melt (ULM) toners. In embodiments, the dry toner particles, exclusive of external surface additives, may have the following characteristics:

(1) Volume average diameter (also referred to as "volume average particle diameter") of from about 2.5 to about 20 µm, in embodiments from about 2.75 to about 10 µm, in other embodiments from about 3 to about 7.5 µm.

(2) Number Average Geometric Standard Deviation (GSDn) and/or Volume Average Geometric Standard Deviation (GSDv) of from about 1.18 to about 1.30, in embodiments from about 1.21 to about 1.24.

(3) Circularity of from about 0.9 to about 1 (measured with, for example, a Sysmex FPIA 2100 analyzer), in embodiments form about 0.95 to about 0.985, in other embodiments from about 0.96 to about 0.98.

Developers

The toner particles thus formed may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Carriers

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 to about 70 weight % to about 70 to about 30 weight %, in embodiments from about 40 to about 60 weight % to about 60 to about 40 weight %. The coating may have a coating weight of, for example, from about 0.1 to about 5% by weight of the carrier, in embodiments from about 0.5 to about 2% by weight of the carrier.

In embodiments, PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 to about 10 percent by weight, in embodiments from about 0.01 percent to about 3 percent by weight, based on the weight of the coated carrier particles, until adherence thereof to the carrier core by mechanical impaction and/or electrostatic attraction.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 µm in size, in embodiments from about 50 to about 75 µm in size, coated with about 0.5% to about 10% by weight, in embodiments from about 0.7% to about 5% by weight of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

Imaging

The toners can be utilized for electrophotographic processes, including those disclosed in U.S. Pat. No. 4,295,990, the disclosure of which is hereby incorporated by reference in its entirety. In embodiments, any known type of image development system may be used in an image developing device, including, for example, magnetic brush development, jumping single-component development, hybrid scavengeless development (HSD), and the like. These and similar development systems are within the purview of those skilled in the art.

Imaging processes include, for example, preparing an image with an electrophotographic device including a charging component, an imaging component, a photoconductive component, a developing component, a transfer component, and a fusing component. In embodiments, the development component may include a developer prepared by mixing a carrier with a toner composition described herein. The electrophotographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser member. The fusing member can be of any desired or suitable configuration, such as a drum or roller, a belt or web, a flat surface or platen, or the like. The fusing member can be applied to the image by any desired or suitable method, such as by passing the final recording substrate through a nip formed by the fusing member and a back member, which can be of any desired or effective configuration, such as a drum or roller, a belt or web, a flat surface or platen, or the like. In embodiments, a fuser roll can be used. Fuser roll members are contact fusing devices that are within the purview of those skilled in the art, in which pressure from the roll, optionally with the application of heat, may be used to fuse the toner to the image-receiving medium. Optionally, a layer of a liquid such as a fuser oil can be applied to the fuser member prior to fusing.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 30° C.

EXAMPLES

Example 1

Preparation of propoxylated Bisphenol-A monomer. A 1 Liter Buchi reactor, equipped with a mechanical stirrer, distillation apparatus and bottom drain valve, was charged with Bisphenol-A (about 223.65 grams), propylene carbonate (about 208.41 grams) and potassium carbonate (about 0.6 grams). The contents were heated to about 185° C. for about 4 hours under a nitrogen purge. The product was then allowed to cool to about 100° C. and then discharged through the bottom drain valve.

Example 2

Preparation of ethoxylated Bisphenol-A monomer. A 1 Liter Buchi reactor, equipped with a mechanical stirrer, distillation apparatus and bottom drain valve, was charged with Bisphenol-A (about 223.65 grams), ethylene carbonate (about 179.9 grams) and potassium carbonate (about 0.6 grams), and then heated to about 185° C. for about 4 hours under a nitrogen purge. The product was then allowed to cool to about 100° C. and the contents were then discharged through the bottom drain valve.

Example 3

Preparation of a linear polyester resin derived from 0.24 mole equivalent of terephthalic acid, 0.50 mole equivalent of propoxylated bisphenol-A, 0.10 mole equivalent of 2-dodecylsuccinic anhydride, and 0.16 mole equivalent of fumaric acid.

A 2 Liter Hoppes reactor, equipped with a mechanical stirrer, distillation apparatus and bottom drain valve, was charged with propoxylated Bisphenol-A from Example 1 (about 352 grams), terephthalic acid (about 80.7 grams), 2-dodecylsuccinc anhydride (about 53.2 grams) and 1.0 grams of FASCAT 4201 (dibutyl tin oxide) catalyst. The reactor temperature was increased to about 240° C. over a 4 hour period, and maintained at that temperature for an additional 12 hours. The reactor was then allowed to cool to about 185° C., and fumaric acid (about 40 grams) with hydroquinone (about 0.22 grams) were added.

The reactor temperature was then slowly increased to about 205° C. over a 2 hour period, and the pressure was then reduced to about 6 Kpa and maintained for an additional 6 hours. The contents were then discharged through the bottom drain valve to produce a polyester resin with a glass transition temperature (Tg) of about 63.1° C., a softening point of about 118° C., an acid number of about 11.4 meq/KOH, a number average molecular weight of about 4,000 daltons, and weight average molecular weight of about 13,200 daltons.

About 125 grams of the above resin was measured into a 2 liter beaker containing about 917 grams of ethyl acetate. The mixture was stirred at about 250 revolutions per minute and heated to about 67° C. to dissolve the resin in the ethyl acetate. About 3.05 grams of sodium bicarbonate was measured into a 4 liter Pyrex glass flask reactor containing about 708 grams of deionized water and heated to about 65° C. Homogenization of the heated water solution in the 4 liter glass flask reactor was commenced with an IKA Ultra Turrax T50 homogenizer at about 4,000 revolutions per minute. The heated dissolved resin in ethyl acetate was then slowly poured into the water solution. As the mixture continued to be homogenized, the homogenizer speed was increased to about 10,000 revolutions per minute and homogenization was carried out at these conditions for about 30 minutes. At completion of homogenization, the glass flask reactor and its contents were placed in a heating mantle and connected to a distillation device. The mixture was stirred at about 400 revolutions per minute and the temperature of the mixture was increased to 80° C. at about 1° C. per minute to distill off the ethyl acetate from the mixture. Stirring of the mixture is continued at 80° C. for about 120 minutes followed by cooling at about 2° C. per minute to room temperature. The product was screened through a 20 micron sieve and the pH was adjusted to about 7.0 with the addition of about 1.0 normal sodium hydroxide. The resulting polyester resin emulsion included about 18% by weight solids in water as measured gravimetrically, and had a volume average diameter of about 280 nanometers as measured with a HONEYWELL MICROTRAC® UPA150 particle size analyzer.

Example 4

Preparation of a branched polyester resin derived from about 0.255 mole equivalent of terephthalic acid, about 0.40 mole equivalent of propoxylated bisphenol-A, about 0.10 mole equivalent of ethoxylated bisphenol-A, about 0.21 mole equivalent of 2-dodecylsuccinic anhydride, and about 3.5 mole equivalent of trimellitic anhydride.

A 2 Liter Hoppes reactor, equipped with a mechanical stirrer, distillation apparatus and bottom drain valve, was charged with propoxylated Bisphenol-A from Example 1 (about 352.8 grams), ethoxylated Bisphenol-A from Example 2 (about 79.6 grams), terephthalic acid (about 106.3 grams), 2-dodecylsuccinc anhydride (about 138.3 grams) and about 1.0 grams of FASCAT 4201 (dibutyl Tin oxide) catalyst. The reactor temperature was then increased to about 240° C. over a 4 hour period, and maintained at that temperature for an additional 12 hours. The reactor was then allowed to cool to about 185° C., and trimellitic anhydride (about 16.7 grams) was added.

The reactor temperature was then slowly increased to about 235° C. over about a 2 hour period, and then the pressure was reduced to about 6 Kpa and maintained for an additional 4 hours. The contents were then discharged through the bottom drain valve to produce a polyester resin with a glass transition temperature of about 63° C., a softening point of about 129.8° C., an acid number of about 9.21 meq/KOH, a number average molecular weight of about 6,200 daltons, and weight average molecular weight of about 44,100 daltons.

About 125 grams of the above resin was measured into a 2 liter beaker containing about 917 grams of ethyl acetate. The mixture was stirred at about 250 revolutions per minute and heated to about 67° C. to dissolve the resin in the ethyl acetate. About 3.05 grams of sodium bicarbonate was measured into a 4 liter Pyrex glass flask reactor containing about 708 grams of deionized water and heated to about 65° C. Homogenization of the heated water solution in the 4 liter glass flask reactor was commenced with an IKA Ultra Turrax T50 homogenizer at about 4,000 revolutions per minute. The heated dissolved resin in ethyl acetate was then slowly poured into the water solution. As the mixture continued to be homogenized, the homogenizer speed was increased to about 10,000 revolutions per minute and homogenization was carried out at these conditions for about 30 minutes. At completion of homogenization, the glass flask reactor and its contents were placed in a heating mantle and connected to a distillation device. The mixture was stirred at about 400 revolutions per minute and the temperature of the mixture was increased to 80° C. at about 1° C. per minute to distill off the ethyl acetate from the mixture. Stirring of the mixture is continued at 80° C. for about 120 minutes followed by cooling at about 2° C. per minute to room temperature. The product was screened through a 20 micron sieve and the pH was adjusted to about 7.0 with the addition of about 1.0 normal sodium hydroxide. The resulting polyester resin emulsion included about 18% by weight solids in water as measured gravimetrically, and had a volume average diameter of about 210 nanometers as measured with a HONEYWELL MICROTRAC® UPA150 particle size analyzer.

Example 5

A crystalline polyester resin was prepared from dodecanedioic acid and nonane diol. A 1 liter Parr reactor, equipped with an electric heater, distillation apparatus and double turbine agitator and bottom drain valve, was charged with dodecanedioic acid (about 345 grams) 1,9-nonanediol (about 235 grams) and butyl tin oxide hydroxide (about 0.5 grams). The mixture was heated to about 185° C. for about 4 hours, during which time water was collected as a byproduct through the distillation apparatus. The mixture was then heated to about 205° C. for about 1 hour and then subjected to vacuum (about 0.1 mm-Hg) for a duration of about 1 hour after which the contents were discharged through the bottom drain valve and cooled to room temperature. The resin product, poly(nonyl-dodecanoate), displayed a melting point of about 70° C., a number average molecular weight of about 1,500 daltons, and a weight average molecular weight of about 3,100 daltons.

About 125 grams of the above resin was measured into a 2 liter beaker containing about 917 grams of ethyl acetate. The mixture was stirred at about 250 revolutions per minute and heated to about 67° C. to dissolve the resin in the ethyl acetate. About 3.05 grams of sodium bicarbonate was measured into a 4 liter Pyrex glass flask reactor containing about 708 grams of deionized water and heated to about 65° C. Homogenization of the heated water solution in the 4 liter glass flask reactor was commenced with an IKA Ultra Turrax T50 homogenizer at about 4,000 revolutions per minute. The heated dissolved resin in ethyl acetate was then slowly poured into the water solution. As the mixture continued to be homogenized, the homogenizer speed was increased to about 10,000 revolutions per minute and homogenization was carried out at these conditions for about 30 minutes. At completion of homogenization, the glass flask reactor and its contents were placed in a heating mantle and connected to a distillation device. The mixture was stirred at about 400 revolutions per minute and the temperature of the mixture was increased to about 80° C. at about 1° C. per minute to distill off the ethyl acetate from the mixture.

Stirring of the mixture continued at about 80° C. for about 120 minutes followed by cooling at about 2° C. per minute to room temperature. The product was screened through a 20 micron sieve and the pH was adjusted to about 7.0 with the addition of about 1.0 normal sodium hydroxide. The resulting polyester resin emulsion included about 18% by weight solids in water as measured gravimetrically, and had a volume average diameter of about 220 nanometers as measured with a HONEYWELL MICROTRAC® UPA150 particle size analyzer.

Example 6

A cyan polyester toner was prepared having particles of about 5.8 microns in size.

About 566.5 grams of deionized water (DIW) was combined with about 85 grams of the polyester resin of Example 3, about 85 grams of the branched polyester resin of Example 4, about 34 grams of the crystalline polyester latex of Example 5, about 3.67 grams of a DOWFAX™ anionic surfactant (an alkyldiphenyloxide disulfonate from the Dow Chemical Company), about 52.9 grams of Pigment Blue 15:3 cyan pigment, and about 46.2 grams of an aqueous dispersion including a polyethylene wax available from IGI Wax, having a particle size of about 220 nm and a solids content of about 20% solids in water. The slurry mixture was pH adjusted to about 4 with diluted nitric acid. The toner slurry was then homogenized using a portable Turrex homogenizer probe at a mixing speed of from about 4000 to about 6000 revolutions per minute (rpm) for about 10 minutes. About 0.2 ppH of aluminum sulfate flocculent was also added during the homogenization process The resulting toner slurry was charged into a 2 liter Buchi stainless steel reactor. The reactor was installed with a mechanical agitator and equipped with double impellers. The mixture was agitated at about 450 rpm for about 5 minutes. The mixture was then heated to about 45° C. as part of the toner aggregation process. Particle growth was monitored during the heat-up, with particle size checked from time to time. When the reactor temperatures reached about 45° C., the toner particle growth was monitored closely until the particle size was about 5 microns.

Then, about 47.5 grams of the polyester resin emulsion of Example 3, and about 47.5 grams of the branched polyester resin emulsion of Example 4, was added as a shell latex and heated for about 30 minutes. At this time the particle size was from about 5.6 microns to about 5.8 microns. The growth of the toner particles was then stopped by adding a small amount of NaOH solution which raised the toner slurry pH to above 7.5, followed by a coalescence process at temperatures above the Tg of the toner resins, about 82° C. The entire process, from raw materials preparation, homogenization, aggregation, to coalescence, took from about 7 hours to about 8 hours. When the desired toner particle size was obtained, the toner slurry was quenched and discharged from the 2 liter reactor.

The resulting cyan polyester toner particles were about 5.8 microns in size, and possessed a GSD of about 1.23, a smooth, potato-type morphology, and a solids content of about 13% by weight. The final solids particles were filtered from the mother liquor, followed by screening and washing at room temperature prior to the drying process.

The resulting toner particles included about 25.3% by weight of the polyester resin of Example 3, about 25.3% by weight of the branched polyester resin of Example 4, about 6.8% by weight of the crystalline resin of Example 5, about 5.5% by weight of Pigment Blue 15:3, and about 9% by weight of the wax in the core, with about 14% by weight of each of the polyester and branched polyester resin as the shell.

Fusing data obtained for the toners of the present disclosure showed satisfactory performance.

The toner was imaged and fused on a Xerox Docucolor 700 printer. A TMA (Toner Mass per unit Area) of 1.00 mg/cm$^2$ was made on CX+ paper (Color Xpressions+, 90 gsm, uncoated, P/N 3R11540) and used for gloss, crease, and hot offset measurements. Gloss/crease targets were a square image placed in the centre of the page. In general, two passes through the printer while adjusting developer bias voltage was required to achieve the desired TMA. For the toner of Example 6, a minimum fixing temperature (MFT) of about 122° C., a hot-offset temperature of about 190° C. and a peak gloss of about 62 was obtained.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
reacting an organic diol selected from the group consisting of 1,2-propanediol, 1,3-propanediol, 1,3-butane diol pentylene glycol, hexylene glycol, diphenol, neopentyl glycol, diethylene glycol, dipropylene glycol, 2,2-bis-(4-hydroxy phenyl) propane, 2,2-bis-(3-hydroxy phenyl)propane, 2,2-bis-(2-hydroxy phenyl)propane, 2,2-bis-(3-hydroxy phenyl)propane, 2,2-bis(5-hydroxy phenyl)propane, Bisphenol A, ethoxylated Bisphenol-A, bis-(4-hydroxy phenyl)methane, 1,1-bis-(4-hydroxy phenyl)ethane, cis-1,4-dihydroxy-cyclohexane, trans-1,4-dihydroxy cyclohexane, cis-1,2-dihydroxy-cyclohexane, trans-1,2-dihydroxy-cyclohexane, trans-1,3-dihydroxy-cyclohexane, cis-1,3-dihydroxy-cyclohexane, and combinations thereof, with a cyclic alkylene carbonate selected from the group consisting of ethylene carbonate, propylene carbonate, butylene carbonate, and combinations thereof, in the presence of a first catalyst of an alkali carbonate to form a polyalkoxy diol;
contacting the polyalkoxy diol with an additional amount of cyclic alkylene carbonate in the presence of a second catalyst of an alkali alkoxide to form a mixture;
polycondensing the resulting mixture with a dicarboxylic acid and an anhydride selected from the group consisting of maleic anhydride, trimellitic anhydride, n-dodecenylsuccinic anhydride, 2-dodecenylsuccinic anhydride, 2-undecenylsuccinic anhydride, and combinations thereof, the diacid and the anhydride utilized in a combined amount of from about 0.90 mole equivalents to about 1.1 mole equivalents; and
recovering an unsaturated polyester.

2. The process according to claim 1, wherein the diol is utilized in an amount of from about 0.90 mole equivalents to about 1.1 mole equivalents, based on about 1 mole equivalent of dicarboxylic acid utilized, and wherein the cyclic alkylene carbonate is utilized in an amount of from about 1.90 mole equivalents to about 2.45 ma equivalents, based an about 1 mole equivalent of organic diol utilized.

3. The process according to claim 1, wherein the first catalyst comprises an alkali carbonate selected from the group consisting of potassium carbonate, sodium carbonate, rubidium carbonate, cesium carbonate, beryllium carbonate, magnesium carbonate, calcium carbonate, strontium carbonate, manganese carbonate, barium carbonate, and combinations thereof, utilized in an amount of from about 0.001 mole equivalents to about 0.1 mole equivalents, based on about 1 mole equivalent of organic diol utilized, and wherein the second catalyst comprises an alkali alkoxide selected from the group consisting of lithium methoxide, lithium ethoxide, lithium propoxide, lithium butoxide, isopropoxide, lithium isobutoxide, lithium t-butoxide, potassium methoxide potassium ethoxide, potassium propoxide, potassium butoxide, potassium isopropoxide, potassium isobutoxide, potassium t-butoxide, sodium methoxide, sodium ethoxide, sodium propoxide, sodium butoxide, sodium isopropoxide, sodium isobutoxide, sodium t-butoxide, and combinations thereof, utilized in an amount of from about 0.001 mole equivalents to about 0.1 mole equivalents, based on about 1 mole equivalent of organic diol utilized.

4. The process according to claim 1, wherein the dicarboxylic acid is selected from the group consisting of fumaric acid, malonic acid, itaconic acid, 2-methylitaconic acid, maleic acid, trimelitic acid, adipic acid, succinic acid, suberic acid, 2-ethyl succinic acid, glutaric acid, dodecylsuccinic acid, 2-methyladipic acid, pimelic acid; azelaic acid, sebacic acid, terephthalic acid, isophthalic acid, phthalic acid, 1,2-cyclohexanedioic acid, 1,3-cyclohexanedioic acid, 1,4-cyclohexanedioic acid; dialkyl esters wherein alkyl contains from about 2 to about 18 carbon atoms, and are esters of malonate, succinate, fumarate, itaconate, terephthalate, isophthalate, phthalate, cyclohexanedioate, and combinations thereof.

5. The process according to claim 1, wherein said reacting is accomplished by heating at a temperature of from about 160° C. to about 215° C., and wherein said polycondensing is accomplished by heating at a temperature of from about 185° C. to about 225° C. for a duration of from about 1 hour to about 5 hours, followed by reducing pressure of the mixture from about 760 Torr to about 1 Torr over a period of from about 1 hour to about 6 hours.

6. The process according to claim 1, wherein the unsaturated polyester resin is selected from the group consisting of poly(propoxylated bisphenol co-fumarate), poly(ethoxylated bisphenol co-fumarate), poly(butoxylated bisphenol co-fumarate), poly(co-propoxylated bisphenol co ethoxylated bisphenol co-fumarate), poly(1,2-propylene fumarate), poly(propoxylated co-maleate), poly(ethoxylated bisphenol co-maleate), poly(butyloxylated bisphenol co-maleate), poly(co-propoxylated bisphenol co ethoxylated bisphenol co-maleate), poly(1,2-propylene maleate, poly(propoxylated bisphenol co-itaconate), poly(ethoxylated bisphenol co-itaconate), poly(butyloxylated bisphenol co-itaconate), poly(co-propoxylated bisphenol co ethoxylated bisphenol co-itaconate), poly(1,2-propylene itaconate), and combinations thereof.

* * * * *